(12) United States Patent
Winterling et al.

(10) Patent No.: US 7,470,765 B2
(45) Date of Patent: Dec. 30, 2008

(54) METHOD FOR PRODUCING POLYAMIDES

(75) Inventors: Helmut Winterling, Ludwigshafen (DE); Christoph Benisch, Mannheim (DE); Thilo Hahn, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/511,162

(22) PCT Filed: Apr. 8, 2003

(86) PCT No.: PCT/EP03/03614

§ 371 (c)(1),
(2), (4) Date: Oct. 14, 2004

(87) PCT Pub. No.: WO03/089496

PCT Pub. Date: Oct. 30, 2003

(65) Prior Publication Data

US 2005/0154182 A1    Jul. 14, 2005

(30) Foreign Application Priority Data

Apr. 18, 2002    (DE) ............................... 102 17 439

(51) Int. Cl.
*C08G 69/00* (2006.01)

(52) U.S. Cl. .................. 528/310; 528/170; 528/312; 528/319; 528/320; 528/322; 528/323; 528/324

(58) Field of Classification Search ................. 528/310, 528/322; 521/170, 310, 312, 319, 320, 322, 521/323, 324

See application file for complete search history.

(56) References Cited

U.S. PATENT DOCUMENTS

| 6,288,207 | B1 * | 9/2001 | Mohrschladt et al. | ........ 528/310 |
| 6,316,588 | B1 * | 11/2001 | Mohrschladt et al. | ........ 528/310 |
| 6,815,527 | B2 * | 11/2004 | Bassler et al. | ............... 528/310 |
| 6,878,798 | B2 * | 4/2005 | Ohlbach et al. | ............. 528/310 |

FOREIGN PATENT DOCUMENTS

| JP | 1-201023 | * | 8/1989 |
| WO | 01/09224 | | 2/2001 |

OTHER PUBLICATIONS

BASF 51573, Continous preparation of polyamides from aminonitriles 1-29 date unknown.

* cited by examiner

*Primary Examiner*—Irina S Zemel
(74) *Attorney, Agent, or Firm*—Novak Druce + Quigg LLP

(57) ABSTRACT

A process for preparing a polyamide by reacting a mixture which comprises a monomer which has a nitrile group and has at least one other functional group capable of forming a carboxamide group, and comprises water, in the presence of titanium dioxide as catalyst, which comprises using titanium dioxide whose BET surface area, determined to the German standard DIN 66 131 volumetrically by the multipoint method, is in the range from 5 to 35 $m^2/g$.

14 Claims, No Drawings

METHOD FOR PRODUCING POLYAMIDES

The present invention relates to a process for preparing a polyamide by reacting a mixture which comprises a monomer which has a nitrile group and has at least one other functional group capable of forming a carboxamide group, and comprises water, in the presence of titanium dioxide as catalyst, which comprises using titanium dioxide whose BET surface area, determined to the German standard DIN 66 131 volumetrically by the multipoint method, is in the range from 5 to 35 $m^2/g$.

Polyamides, in particular nylon-6 and nylon-6,6, are important industrial polymers.

WO 99/38906, WO 99/38908, and WO 01/09224 are examples of disclosures of preparation processes via reaction of a mixture which comprises a monomer which has a nitrile group and has at least one other functional group capable of forming a carboxamide group, and comprises water, in the presence of titanium dioxide as catalyst.

It is pointed out here in WO 99/38906, WO 99/38908 and WO 01/09224 that the titanium dioxide is to have a BET surface area of more than 40 $m^2/g$, preferably more than 100 $m^2/g$, since if the BET surface area selected is smaller the bed volume selected has to be higher to ensure sufficient catalyst activity. Examples of titanium dioxides mentioned in WO 99/38906, WO 99/38908, and WO 01/09224 therefore have BET surface areas of 46, 50, 73, and 116 $m^2/g$.

Although the processes mentioned in WO 99/38906, WO 99/38908, and WO 01/09224 give polymer with properties which are good per se, it is desirable to reduce the titanium dioxide content of the polymer which results when the catalyst becomes distributed in the material, even though this content is considerably lower than the level of contamination of the polymer when homogeneous catalysis is used. The higher the titanium dioxide content of the polymer, the higher the loss of catalyst per unit quantity of polymer. Reduction of titanium dioxide content in the polymer is desirable in order to achieve longer catalyst operating time.

It is an object of the present invention to provide a process which permits the preparation of polyamides by reacting a mixture which comprises a monomer which has a nitrile group and has at least one other functional group capable of forming a carboxamide group, and comprises water, in the presence of titanium dioxide as catalyst in a manner which is technically simple and cost-effective, in particular without any reduction of catalyst activity when comparison is made with the known prior-art processes, eliminating the disadvantage mentioned.

We have found that this object is achieved by the process defined at the outset.

Polyamides are homopolymers, copolymers, mixtures, and grafts derived from synthetic long-chain polyamides, and containing, in the main polymer chain, repeat carboxamide groups as a substantial constituent. Examples of these polyamides are nylon-6 (polycaprolactam), nylon-6,6 (polyhexamethyleneadipamide), nylon-4,6 (polytetramethyleneadipamide), nylon-6,10 (polyhexamethylenesebacamide), nylon-7 (polyenantholactam), nylon-11 (polyundecanolactam), nylon-12 (polydodecanolactam). These polyamides are known to have the generic name nylon. Polyamides also include what are known as aramids (aromatic polyamides), such as polymetaphenyleneisophthalamide (NOMEX®, U.S. Pat. No. 3,287,324) or polyparapheneleneterephthalamide (KEVLAR®, U.S. Pat. No. 3,671,542).

According to the invention, the polyamide is prepared using a mixture which comprises a monomer which has a nitrile group and at least one, for example 1, 2, 3, 4, 5, preferably 1, 2, or 3, in particular 1, other functional group capable of forming a carboxamide group.

The functional group capable of forming a carboxamide group is advantageously a carboxylic acid group or a functional group from which a carboxylic acid equivalent can be made available in the process of the invention for the purposes of forming a carboxamide group, examples being a nitrile group, a carboxylic ester group, a carboxamide group, or advantageously an amine group, or a functional group from which an amine equivalent can be released in the process of the invention for the purposes of forming a carboxamide group. If the monomer has two or more of these functional groups capable of forming a carboxamide group, the groups in the monomer may be identical or different. It is possible to use-either one monomer or a mixture of two or more of these monomers, these being described in the same way as monomer for the purposes of the present invention.

In one preferred embodiment, use may be made of a monomer selected from the group consisting of dinitrile, nitrilocarboxamide, nitrilocarboxylic acid, nitrilocarboxylic ester, aminonitrile, and mixtures of these. In one particularly preferred embodiment, use is made of an aliphatic monomer. Monomers which have proved advantageous here are those in which the nitrile group and the other functional group capable of forming a carboxamide group are in alpha,omega positions, and in particular a monomer selected from the group consisting of alpha,omega-dinitrile, alpha,omega-nitrilocarboxamide, alpha,omega-nitrilocarboxylic acid, alpha,omega-nitrilocarboxylic ester, alpha,omega-aminonitrile, and mixtures of these.

Among the alpha,omega-aminonitriles, preference is given to those having from 4 to 12 carbon atoms, especially those having from 4 to 9 carbon atoms, in the alkylene radical, or an aminoalkylenearylenenitrile having from 8 to 13 carbon atoms, in particular those which, between the aromatic unit and the amino and nitrile group, have an alkylene group having at least one carbon atom. Among the aminoalkylenearylenenitriles, particular preference is given to those which have the amino and nitrile group in 1,4-positions in relation to the arylene system.

The alpha,omega-aminonitriles used are more preferably linear alpha,omega-aminoalkylenenitriles, the alkylene radical (—$CH_2$—)$_n$ preferably having from 4 to 12 carbon atoms, particularly preferably from 4 to 9 carbon atoms, examples being 5-amino-1-cyanopentane (6-aminocapronitrile), 6-amino-1-cyanohexane, 7-amino-1-cyanoheptane, 8-amino-1-cyanooctane, 9-amino-1-cyanononane, particular preference being given to 6-aminocapronitrile.

6-Aminocapronitrile is usually obtained by using known processes to hydrogenate adiponitrile, for example those mentioned in WO 99/38906, WO 99/38908, and WO 01/09224.

Among the alpha,omega-dinitriles, preference is given to those having from 3 to 11 carbon atoms, especially those having from 3 to 8 carbon atoms, in the alkylene radical, or an alkylenearylenedinitrile having from 7 to 12 carbon atoms, in particular those which, between the aromatic unit and the two nitrile groups, have an alkylene group having at least one carbon atom. Among the alkylenearylenedinitriles, particular preference is given to those which have the two nitrile groups in 1,4-positions in relation to the arylene system.

The alpha,omega-dinitriles used are more preferably linear alpha,omega-alkylenedinitriles, the alkylene radical (—$CH_2$—)$_n$ preferably having from 3 to 11 carbon atoms, particularly preferably from 3 to 8 carbon atoms, examples being propane-1,3-dinitrile, butane-1,4-dinitrile (adiponitrile), pentane-1,5-dinitrile, hexane-1,6-dinitrile, heptane-1,7-dinitrile, octane-1,8-dinitrile, particular preference being given to adiponitrile.

Among the alpha,omega-nitrilocarboxylic acids, preference is given to those having from 3 to 11 carbon atoms, especially those having from 3 to 8 carbon atoms, in the alkylene radical, or a nitriloalkylenearylenecarboxylic acid having from 7 to 12 carbon atoms, in particular those which, between the aromatic unit and the carboxylic acid group and nitrile group, have an alkylene group having at least one carbon atom. Among the nitriloalkylenearylenecarboxylic acids, particular preference is given to those which have the carboxylic acid group and nitrile group in 1,4-positions in relation to the arylene system.

The alpha,omega-nitrilocarboxylic acids more preferably used are linear alpha,omega-nitriloalkylenecarboxylic acids, the alkylene radical ($-CH_2-$)$_n$ preferably having from 3 to 11 carbon atoms, particularly preferably from 4 to 9 carbon atoms, examples being 5-nitrilo-1-pentanecarboxylic acid (5-cyanovaleric acid), 6-nitrilo-1-hexanecarboxylic acid, 7-nitrilo-1-heptanecarboxylic acid, 8-nitrilo-1-octanecarboxylic acid, 9-nitrilo-1-nonane-carboxylic acid, particularly preferably 5-cyanovaleric acid.

Among the alpha,omega-nitrilocarboxamides, preference is given to those having from 3 to 11 carbon atoms, especially those having from 3 to 8 carbon atoms, in the alkylene radical, or a nitriloalkylenearylenecarboxamide having from 7 to 12 carbon atoms, in particular those which, between the aromatic unit and the carboxamide group and nitrile group, have an alkylene group having at least one carbon atom. Among the nitriloalkylene-arylenecarboxamides, particular preference is given to those which have the carboxamide group and nitrile group in 1,4-positions in relation to the arylene system.

The alpha,omega-nitrilocarboxamides used are more preferably linear alpha,omega-nitriloalkylenecarboxamides, the alkylene radical ($-CH_2-$)$_n$ preferably having from 3 to 11 carbon atoms, particularly preferably from 3 to 8 carbon atoms, examples being 5-nitrilo-1-pentanecarboxamide (5-cyanovaleramide), 6-nitrilo-1-hexanecarboxamide, 7-nitrilo-1-heptanecarboxamide, 8-nitrilo-1-octanecarboxamide, 9-nitrilo-1-nonanecarboxamide, particularly preferably 5-cyanovaleramide.

Among the alpha,omega-nitrilocarboxylic esters, preference is given to the abovementioned nitrilocarboxylic acids in the alpha,omega-nitrilocarboxylic acid component.

Preferred alcohol components of the ester are C1-C4-alkyl, such as methyl, ethyl, n-propyl, isopropyl, n-butyl, isobutyl, sec-butyl, or tert-butyl, in particular methyl.

It is preferable to use 5-nitrilo-1-pentanecarboxylic esters (5-cyanovaleric esters), 6-nitrilo-1-hexanecarboxylic esters, 7-nitrilo-1-heptanecarboxylic esters, 8-nitrilo-1-octane-carboxylic esters, 9-nitrilo-1-nonanecarboxylic esters, particularly preferably methyl 5-cyanovalerate.

Monomers which may be used with particular preference -are those suitable for forming nylon-6, nylon-6,6, or copolymers of these, for example adiponitrile, 5-cyanovaleramide, 5-cyanovaleric acid, $C_1$-$C_4$-alkyl cyanovalerates, 6-aminocapronitrile, or a mixture of these, in particular adiponitrile, 5-cyanovaleramide, 5-cyanovaleric acid, 6-aminocapronitrile, or mixtures of these, particularly preferably 6-aminocapronitrile, adiponitrile, or a mixture of these.

If the monomer used comprises a compound in which the ratio between the molar total obtained from the nitrile group and the functional groups from which a carboxylic acid equivalent can be made available in the process of the invention for the purposes of forming a carboxamide group, including the carboxylic acid groups themselves, and the molar total obtained from the amino groups and the functional groups from which an amino equivalent can be made available in the process of the invention for the purposes of forming a carboxamide group is outside the range of from 0.9:1 to 1:0.9, for example as is the case with adiponitrile, 5-cyanovaleric acid, 5-cyanovaleramide, and alkyl 5-cyanovalerates, in which the ratio of the two molar totals to one another is 2:0, it is advantageous to use an addition of compounds suitable for forming polyamides so that the ratio of the molar total obtained from the nitrile group and the functional groups from which a carboxylic acid equivalent can be made available in the process of the invention for the purposes of forming a carboxamide group, including the carboxylic acid groups themselves, and the molar total obtained from the amino groups and the functional groups from which an amino equivalent can be made available in the process of the invention for the purposes of forming a carboxamide group is shifted into the range from 0.9:1 to 1:0.9.

In the case of a monomer selected from the group consisting of dinitrile, nitrilocarboxamide, nitrilocarboxylic acid, nitrilocarboxylic ester, and mixtures of these, it is advantageous to use an addition of a polyfunctional, for example bi-, tri-, or tetrafunctional, amine (i.e. a diamine), preferably in the case of a diamine so that the molar ratio between the monomer mentioned and the diamine is in the range from 0.9:1 to 1:0.9, in particular from 0.95:1 to 1:0.95.

Diamines which may be used individually or in a mixture are in principle any diamines. Among these, preference is given to the alpha,omega-diamines, preference among the latter being given to those having from 2 to 12 carbon atoms, especially those having from 2 to 10 carbon atoms, in the alkylene radical, or an alkylenearylenediamine having from 8 to 13 carbon atoms, in particular those which, between the aromatic unit and the two amino groups, have an alkylene group having at least one carbon atom. Among the alkylene-arylenediamines, particular preference is given to those which have the two amino groups in 1,4-positions in relation to the arylene system.

The alpha,omega-diamines used are more preferably linear alpha,omega-alkylenediamines, the alkylene radical ($-CH_2-$)$_n$ preferably having from 2 to 12 carbon atoms, particularly preferably from 2 to 10 carbon atoms, examples being 1,2-diaminoethane, 1,3-diaminopropane, 1,4-diaminobutane, 1,5-diaminopentane, 1,6-diaminohexane (hexamethylenediamine), 1,7-diaminoheptane, 1,8-diaminooctane, 1,9-diaminononane, 1,10-diaminodecane, particularly preferably hexamethylenediamine.

More preferred alpha,omega-diamines are alpha,omega-alkylene-diamines, the alkylene radical preferably having from 2 to 12 carbon atoms, particularly preferably from 2 to 10 carbon atoms, and at least one carbon atom of the alkylene chain having substitution, preferably by a $C_1$-$C_4$-alkyl radical, such as methyl, ethyl, n-propyl, isopropyl, n-butyl, isobutyl, sec-butyl, or tert-butyl, in particular methyl, an example being 2-methyl-1,5-diaminopentane. An example of a method of obtaining 2-methyl-1,5-diaminopentane is hydrogenation of the by-product 2-methylglutaronitrile arising during the preparation of adiponitrile by double hydrocyanation of butadiene.

In addition to the monomer which has a nitrile group and has at least one other functional group capable of forming a carboxamide group, use may be made of other compounds known to be used as a monomer for preparing polyamides, preferably those selected from the group consisting of lactams, omega-aminocarboxylic acids, omega-aminocarboxamides, omega-aminocarboxylic salts, omega-aminocarboxylic esters, equimolar mixtures of diamines and dicarboxylic acids, dicarboxylic acid/diamine salts, and mixtures of these monomers.

Additional compounds of this type which may be used are a $C_2$-$C_{20}$, preferably $C_2$-$C_{18}$, arylaliphatic or preferably aliphatic lactam, in monomeric or oligomeric form, for example enantholactam, undecanolactam, dodecanolactam, or caprolactam, in particular caprolactam, a $C_2$-$C_{20}$, preferably $C_3$-$C_{18}$, aminocarboxylic acid, in monomeric or oligomeric form, for example 6-aminocaproic acid, 11-aminoundecanoic acid, or else salts of these, such as alkali metal salts, e.g. lithium salts, sodium salts, potassium salts, a $C_2$-$C_{20}$ amino amide, in monomeric or oligomeric form, such as 6-aminocaproamide, 11-aminoundecanamide, esters, in monomeric or oligomeric form, preferably $C_1$-$C_4$-alkyl esters, such as methyl, ethyl, n-propyl, isopropyl, n-butyl, isobutyl, sec-butyl esters, of $C_2$-$C_{20}$, preferably $C_3$-$C_{18}$, aminocarboxylic acids, for example 6-aminocaproic esters, such as methyl 6-aminocaproate, 11-aminoundecanoic esters, such as methyl 11-aminoundecanoate, a $C_2$-$C_{20}$, preferably $C_2$-$C_{12}$, alkyldiamine, in monomeric or oligomeric form, for example tetramethylenediamine or preferably hexamethylenediamine, with a $C_2$-$C_{20}$, preferably $C_2$-$C_{14}$, aliphatic dicarboxylic acid, such as sebacic acid, decanedicarboxylic acid, or adipic acid, a $C_2$-$C_{20}$, preferably $C_2$-$C_{12}$, alkyldiamine, in monomeric or oligomeric form, for example tetramethylenediamine or preferably hexamethylenediamine, with a $C_8$-$C_{20}$, preferably $C_8$-$C_{12}$, aromatic dicarboxylic acid or derivatives thereof, such as chlorides, for example 2,6-naphthalenedicarboxylic acid, preferably isophthalic acid, or terephthalic acid, a $C_2$-$C_{20}$, preferably $C_2$-$C_{12}$, alkyldiamine, in monomeric or oligomeric form, for example tetramethylenediamine or preferably hexamethylenediamine, with a $C_9$-$C_{20}$, preferably $C_9$-$C_{18}$, arylaliphatic dicarboxylic acid or derivatives thereof, such as chlorides, for example o-, m-, or p-phenylenediacetic acid, a $C_6$-$C_{20}$, preferably $C_6$-$C_{10}$, aromatic diamine, in monomeric or oligomeric form, for example m- or p-phenylenediamine, with a $C_2$-$C_{20}$, preferably $C_2$-$C_{14}$, aliphatic dicarboxylic acid, such as sebacic acid, decanedicarboxylic acid, or adipic acid, a $C_6$-$C_{20}$, preferably $C_6$-$C_{10}$, aromatic diamine, in monomeric or oligomeric form, for example m- or p-phenylenediamine, with a $C_8$-$C_{20}$, preferably $C_8$-$C_{12}$, aromatic dicarboxylic acid or derivatives thereof, such as chlorides, for example 2,6-naphthalenedicarboxylic acid, preferably isophthalic acid or terephthalic acid, a $C_6$-$C_{20}$, preferably $C_6$-$C_{10}$, aromatic diamine, in monomeric or oligomeric form, for example m- or p-phenylenediamine, with a $C_9$-$C_{20}$, preferably $C_9$-$C_{18}$, arylaliphatic dicarboxylic acid or derivatives thereof, such as chlorides, for example o-, m- or p-phenylenediacetic acid, a $C_7$-$C_{20}$, preferably $C_8$-$C_{18}$, arylaliphatic diamine, in monomeric or oligomeric form, for example m- or p-xylylenediamine, with a $C_2$-$C_{20}$, preferably $C_2$-$C_{14}$, aliphatic dicarboxylic acid, such as sebacic acid, decanedicarboxylic acid, or adipic acid, a $C_7$-$C_{20}$, preferably $C_8$-$C_{18}$, arylaliphatic diamine, in monomeric or oligomeric form, for example m- or p-xylylenediamine, with a $C_6$-$C_{20}$, preferably $C_6$-$C_{10}$, aromatic dicarboxylic acid or derivatives thereof, such as chlorides, for example 2,6-naphthalenedicarboxylic acid, preferably isophthalic acid or terephthalic acid, a $C_7$-$C_{20}$, preferably $C_8$-$C_{18}$, arylaliphatic diamine, in monomeric or oligomeric form, for example m- or p-xylylenediamine, with a $C_9$-$C_{20}$, preferably $C_9$-$C_{18}$, arylaliphatic dicarboxylic acid or derivatives thereof, such as chlorides, for example o-, m- or p-phenylenediacetic acid, or else homopolymers, copolymers, mixtures, and grafts of these monomers or oligomers.

Oligomers which may be used with advantage are dimers, trimers, tetramers, pentamers, or hexamers of these monomers, or of mixtures of these monomers.

Preference is given here to those additional compounds which during the polymerization give the polyamides nylon-6, nylon-6,6, nylon-4,6, nylon-6,10, nylon-7, nylon-11, nylon-12, or the aramids polymetaphenyleneisophthalamide or polyparaphenylene-terephthalamide, in particular nylon-6 or nylon-6,6, examples being caprolactam, adipic acid, and hexamethylenediamine.

Lactams can be obtained by reacting a cyclic ketone with hydroxylamine to give the corresponding oxime and then using Beckmann rearrangement, or from the corresponding amino nitriles via hydrolytic cyclization prior to or during the polymerization, in particular in the presence of catalysts, such as titanium dioxide, in a manner known per se.

The preparation of omega-aminocarboxylic acids, omega-aminocarboxamides, omega-aminocarboxylic salts, and omega-aminocarboxylic-esters is known per se. They may be prepared from the corresponding amino nitriles prior to or during the polymerization, for example.

The preparation of dicarboxylic acids is known per se. For example, they may be obtained from the corresponding dinitriles prior to or during the polymerization.

Diamines may be prepared in a manner known per se, for example by hydrogenating the corresponding dinitriles.

The reaction may also advantageously take place with addition of chain regulators known per se, such as monocarboxylic acids, preferably $C_1$-$C_{10}$ alkanemonocarboxylic acids, e.g. acetic acid or propionic acid, preferably $C_5$-$C_8$ cycloalkanemonocarboxylic acids, such as cyclopentanecarboxylic acid, cyclohexanecarboxylic acid, or preferably benzene- or naphthalenemonocarboxylic acids, such as benzoic acid, naphthalenecarboxylic acid, or such as dicarboxylic acids, preferably $C_2$-$C_{10}$ alkanedicarboxylic acids, e.g. adipic acid, azelaic acid, sebacic acid, or decane-dicarboxylic acid, preferably $C_5$-$C_8$ cycloalkanedicarboxylic acids, e.g. 1,4-cyclohexanecarboxylic acid, preferably benzene- or naphthalenecarboxylic acids, e.g. isophthalic acid, terephthalic acid, 2,6-naphthalenedicarboxylic acid, or monoamines, preferably $C_1$-$C_{10}$ alkane monoamines, preferably $C_5$-$C_8$ cycloalkane monoamines, e.g. cyclopentylamine, cyclohexylamine, 4-amino-2,2,6,6-tetramethylpiperidine, or a benzene or naphthalene monoamine, e.g. aniline, naphthylamine, or diamines, preferably $C_2$-$C_{10}$ alkanediamines, e.g. hexamethylenediamine, preferably $C_5$-$C_8$ cycloalkanediamines, e.g. 1,4-cyclohexanediamine, preferably benzene-, naphthalene-, or xylylidenediamines, e.g. o-xylylydenediamine, m-xylylydenediamine, p-xylylidenediamine, or a mixture of these known chain regulators. These chain regulators may be used in a manner known per se, preferably in amounts in the range of from 1 to 55 μg/g of polyamide, particularly preferably from 1 to 30 μg/g of polyamide, in particular from 1 to 15 μg/g of polyamide.

According to the invention, use is made of a mixture which comprises a monomer which has a nitrile group and has at least one other functional group capable of forming a carboxamide group, and comprises water.

The molar ratio between monomer, including any added additional compounds capable of polyamide formation, and water should advantageously be in the range from 1:1 to 1:20, preferably from 1:2 to 1:15, in particular from 1:2 to 1:10.

In one preferred embodiment, the mixture should comprise only 6-aminocapronitrile as monomer, and the molar ratio between 6-aminocapronitrile and water should advantageously be in the range from 1:1 to 1:20, preferably from 1:2 to 1:15, in particular from 1:2 to 1:10.

In another preferred embodiment, the mixture should comprise only adiponitrile and hexamethylenediamine as monomer, and the molar ratio of the molar total obtained from adiponitrile and hexamethylenediamine to water should advantageously be in the range from 1:1 to 1:20, preferably from 1:2 to 1:15, in particular from 1:2 to 1:10.

In another preferred embodiment, the mixture should comprise only 6-aminocapronitrile, adiponitrile, and hexamethylenediamine as monomer, and the molar ratio of the total obtained from 6-aminocapronitrile, adiponitrile, and hexamethylenediamine to water should advantageously be in the range from 1:1 to 1:20, preferably from 1:2 to 1:15, in particular from 1:2 to 1:10.

For the inventive reaction of the mixture to give a polyamide, the monomer here and the water may be introduced to the reaction apparatus together or separately.

According to the invention, the polyamide is prepared in the presence of titanium dioxide as catalyst, the BET surface area of the titanium dioxide, determined volumetrically to the German standard DIN 66 131 by the multipoint method, being in the range from 5 to 35 $m^2/g$, preferably in the range from 15 to 35 $m^2/g$.

The titanium dioxide should advantageously be entirely in the anatase form, although it has hitherto also been found possible for from 0 to 30% by weight, advantageously from 20-30% by weight, of the titanium dioxide used, based on the total titanium dioxide used, to be composed of rutile (the remainder being anatase).

The titanium dioxide may advantageously be used in the form of moldings, such as extrudates or pellets. Particular preference is given to pellets of average length from 5 to 20 mm, in particular about 10 mm, and of average diameter from 1 to 6 mm, in particular about 4 mm.

The cutting hardness is not critical per se and may be in the range of small values, such as from 2 N to 10 N, of moderate values, such as from above 10 N to 20 N, or else of higher values, such as above 20 N or above 25 N.

The catalysts may be prepared from commercially available titanium dioxide powders. A portion of the titanium dioxide may be replaced here by other oxides, such as tungsten oxide. In the case of tungsten oxide use may advantageously be made of amounts of up to 40% by weight, preferably up to 30% by weight, in particular from 15 to 25% by weight, based in each case on the entirety of titanium dioxide and tungsten oxide.

The process of conversion to give catalysts may take place by methods known per se, for example those described in Ertl, Knözinger, Weitkamp: "Handbook of heterogeneous catalysis", VCH Weinheim, 1997, pp. 98 et seq.

The reaction of the process of the invention may be carried out batchwise, or preferably continuously.

In the case of continuous operation, the reaction may be carried out in the reactors known per se for preparing polyamides, for example in one or more flow tubes, in one or more stirred tanks, or in combinations of apparatus of this type.

In one preferred embodiment, the reaction of the process of the invention may be carried out in at least one flow tube, and the titanium dioxide used as catalyst may be used in the form of moldings in combination with metallic packings.

The metallic packings preferably have a structure of corrosion-resistant metals, in particular corrosion-resistant steel. These packings may have any suitable shape. They are particularly preferably Raschig rings. These Raschig rings preferably have an average diameter in the range from 2 to 6 mm, preferably about 3 mm.

The size of the titanium dioxide moldings, preferably the titanium dioxide pellets, should advantageously be selected so that firstly it is possible to remove the moldings mechanically without difficulty via filter and screen, and secondly the pressure increase brought about by the flow resistance due to the increased density of solids in the reactor is within industrially controllable limits. The average bulk density in the flow tube reactor may be adjusted via a suitable ratio of titanium dioxide molding to metallic packing. Mixtures of titanium dioxide moldings and metallic packings may also be present here in the flow tube. It is preferable for there to be layering of the titanium dioxide moldings and the metallic packings in the flow tube. It is then advantageously possible for a layer of titanium dioxide moldings to be followed by a layer of metallic packings in the direction of flow. There may also be an alternating layer sequence of the two moldings with from 2 to 20, preferably from 3 to 15, layers.

In another particularly preferred embodiment, the reaction of the process of the invention may be carried out in at least one flow tube, and the titanium dioxide used as catalyst may be in the form of moldings in combination with internals bearing the catalyst and secured to the flow tube. These catalyst-bearing internals may extend over the entire cross section of the tube, or only over portions of the cross section of the tube, for example a segment or an annulus. These internals may have any desired shape. Examples of those used advantageously are nets, perforated plates, and perforated sheets, such as films or metal panels.

The internals preferably have a structure of corrosion-resistant metals, in particular corrosion-resistant steel.

The size of the titanium dioxide moldings, preferably of the titanium dioxide pellets, should advantageously be selected so that firstly it is possible to remove the moldings mechanically without difficulty via filter and screen, and secondly the pressure increase brought about by the flow resistance due to the increased density of solids in the reactor is within industrially controllable limits. The average bulk density in the flow tube reactor may be adjusted via a suitable ratio of titanium dioxide molding to catalyst-bearing internals.

The process of the invention for preparing a polyamide by reacting a mixture which comprises a monomer which has a nitrile group and has at least one other functional group capable of forming a carboxamide group, and comprises water, may take place in one or more, for example two, three, or four, stages, the process parameters for which, such as pressure and temperature, may differ. The ammonia arising during the reaction may advantageously be removed between each of the stages.

Processes for preparing a polyamide by reacting a mixture which comprises a monomer which has a nitrile group and has at least one other functional group capable of forming a carboxamide group, and comprises water, in the presence of titanium dioxide as catalyst are known per se, for example from WO 99/38906, WO 99/38908, and WO 01/09224, the content of which is hereby incorporated into the present description by way of reference. The advantage of the process of the invention over the processes described in WO 99/38906, WO 99/38908, and WO 01/09224 is achievable simply by replacing the titanium dioxide used in one stage of the stages described in WO 99/38906, WO 99/38908, and WO 01/09224 with a titanium dioxide of the present invention. In one particularly advantageous embodiment, all of the titanium dioxide used as catalyst in the processes of WO 99/38906, WO 99/38908, and WO 01/09224 should be replaced by a titanium dioxide of the present invention.

Compared with the processes of WO 99/38906, WO 99/38908, and WO 01/09224, the process of the invention gives a polyamide with reduced titanium dioxide content while other process parameters, such as pressure, temperature, material flow rates, concentrations, and starting materials remain the same.

Surprisingly, it has been found here that the reduction in catalyst activity claimed in the prior art for the BET surface area of the catalyst of the present invention does not occur, the catalyst activity in the process of the invention in fact being just as high as in the processes described in WO 99/38906, WO 99/38908, and WO 01/09224.

EXAMPLES

All examples and comparative examples were carried out in a multistage system as shown diagrammatically in WO 99/38908, FIG. 1.

The reactor (1) used was a tube with void volume 60 liters and internal length 5 m.

The stage (2) used was a 100 l centrifugal separator.

The stage (3) used was a tube packed with Raschig rings (diameter 6 mm, length 6 mm) and having void volume of 30 liters and internal length 2.5 m.

The stage (4) used was a centrifugal separator with volume 264 liters, from which the polymer melt was discharged as an extrudate (A) with the aid of a gear pump.

The process parameters set were the following:
Stage (1):
Mass flow rate: 20 kg/h
6-Aminocapronitrile/water: 1:6 mol/mol
Pressure: 80 bar
Temperature: 240° C.
Stage (2):
Level: 15%
Pressure: 30 bar
Temperature: 250° C.
Stage (3)
Water addition: 10% by weight, based on material flow rate in stage (1)
Pressure: 45 bar
Temperature: 250° C.
Stage 4
Level: 25%
Pressure: 1 bar
Temperature: 260° C.
The following catalysts were used in stage (1):

Comparative Example 1

Stage (1) was packed entirely with a titanium dioxide whose BET surface area was 50 m²/g, and whose extrudate length was in the range from 2 to 14 mm, and whose extrudate thickness was 4 mm, as in WO 99/38908, p. 29, lines 28-31.

Example 1

The titanium dioxide pellets used in comparative example 1 were heat-conditioned at 500° C. for 20 hours prior to installation and had a BET surface area of 30 m²/g.

Example 2

Stage (1) was subdivided into five equal-length segments each of length 1 m, at the inlet to each of which there was a screen made from stainless steel (1.4571), (mesh width 2 mm). Each segment was filled with the catalyst of example 1, and the segments were placed together so that stage (1) of example 2 had the same shape as stage (1) of example 1 and comparative example 1.

The results obtained were as follows:

TABLE 1

| | Titanium dioxide content of polymer [ppm by weight; determined as titanium] | | | | |
| --- | --- | --- | --- | --- | --- |
| | After 24 h | After 48 h | After 96 h | After 144 h | After 240 h |
| Example 1 | 3 | 2 | 2 | 1 | 1 |
| Example 2 | 2 | 1 | — | — | — |
| Comp. ex. 1 | 7 | 6 | 5 | 4 | 4 |

—: below the 1 ppm detection limit

We claim:
1. A process for preparing a polyamide comprising:
heat conditioning a mixture comprising titanium dioxide to produce a titanium dioxide catalyst having a BET surface area in the range from 5 to 30 m²/g determined according to the German standard DIN 66 131 volumetrically by the multipoint method,
reacting a mixture comprising a monomer having a nitrile group and at least one other functional group capable of forming a carboxamide group with water in the presence of the conditioned titanium dioxide catalyst
wherein the conditioned titanium dioxide catalyst has an equivalent catalytic activity when compared with the unconditioned titanium dioxide under identical process parameters.

2. A process as claimed in claim 1, where the titanium dioxide catalyst has a BET surface area in the range from 15 to 30 m2/g.

3. A process as claimed in claim 1, where the monomer has a nitrile group and, as at least one other functional group capable of forming a carboxamide group, has at least one group selected from the group consisting of nitrile group, carboxamide group, carboxylic acid group, ester group, and amino group.

4. A process as claimed in claim 1, where the monomer has been selected from the group consisting of dinitrile, nitrilocarboxamide, nitrilocarboxylic acid, nitrilocarboxylic ester, aminonitrile, and mixtures of these.

5. A process as claimed in claim 1, where the monomer is an aliphatic compound selected from the group consisting of alpha,omega-dinitrile, alpha, omega-nitrilocarboxamide, alpha, omega-nitrilocarboxylic acid, alpha,omega-nitrilocarboxylic ester, alpha,omega-aminonitrile, and mixtures of these.

6. A process as claimed in claim 1, where the monomer has been selected from the group consisting of adiponitrile, 5-cyanovaleramide, 5-cyanovaleric acid, C1-C4-alkyl cyanovalerate, 6-aminocapronitrile, and mixtures of these.

7. A process as claimed in claim 1, where the monomer has been selected from the group consisting of adiponitrile, 5-cyanovaleramide, 5-cyanovaleric acid, 6-aminocapronitrile, and mixtures of these.

8. A process as claimed in claim 3, where the monomer has been selected from the group consisting of dinitrile, nitrilocarboxamide, nitrilocarboxylic acid, nitrilocarboxylic ester, and mixtures of these and is used together with a diamine, the molar ratio of the monomer mentioned to the diamine mentioned being in the range from 0.9:1 to 1:0.9.

9. A process as claimed in claim 8, where the diamine used comprises a compound selected from the group consisting of 1,2-diaminoethane, 1,3-diaminopropane, 1,4-diaminobutane, 1,5-diaminopentane, 2-methyl-1,5-diaminopentane, 1,6-diaminohexane, 1,7-diaminoheptane, 1,8-diaminooctane, 1,9-diaminononane, 1,10-diaminodecane, and mixtures of these.

10. The process of claim 1 wherein said titanium dioxide catalyst comprises moldings having an average length of from 5 to 20 mm and a diameter of from 1 to 6 mm.

11. The process of claim 10 wherein said titanium dioxide catalyst comprises moldings having an average length of 10 mm and an average diameter of 4 mm.

12. The process of claim 1 wherein the mixture that is heat conditioned comprises titanium dioxide and tungsten oxide.

13. The process of claim 12 wherein the mixture that is heat conditioned comprises up to 40% by weight tungsten oxide.

14. The process of claim 1 wherein the mixture comprising titanium dioxide is heat conditioned at 500° C. for 20 hours.

* * * * *